US012812470B2

(12) United States Patent
Wang et al.

(10) Patent No.: US 12,812,470 B2
(45) Date of Patent: Nov. 24, 2026

(54) METHOD, APPARATUS, SYSTEM AND DEVICE FOR CONFIGURING DATA STREAM, AND COMPUTER MEDIUM

(71) Applicant: ZTE CORPORATION, Shenzhen (CN)

(72) Inventors: Xin Wang, Shenzhen (CN); Zijiang Ma, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 18/351,372

(22) Filed: Jul. 12, 2023

(65) Prior Publication Data

US 2024/0129798 A1 Apr. 18, 2024

Related U.S. Application Data

(63) Continuation of application No. 17/123,988, filed on Dec. 16, 2020, now Pat. No. 11,743,770, which is a (Continued)

(30) Foreign Application Priority Data

Jun. 21, 2018 (CN) ......................... 201810645453.8

(51) Int. Cl.
*H04W 28/086* (2023.01)
*H04W 28/02* (2009.01)
*H04W 84/18* (2009.01)

(52) U.S. Cl.
CPC ... *H04W 28/0864* (2023.05); *H04W 28/0263* (2013.01); *H04W 28/0268* (2013.01); *H04W 84/18* (2013.01)

(58) Field of Classification Search
CPC ......... H04W 28/0864; H04W 28/0263; H04W 28/0268; H04W 84/18
See application file for complete search history.

(56) References Cited

U.S. PATENT DOCUMENTS 11,540,349 B2 * 12/2022 Han ...................... H04W 28/10
2015/0180706 A1 * 6/2015 Uchino ............... H04L 41/0661 370/225

(Continued)

FOREIGN PATENT DOCUMENTS

CA 3033466 A1 * 2/2018 ........ H04W 36/0022
CN 103945461 A 7/2014

(Continued)

OTHER PUBLICATIONS

"Establishing a second NG-U tunnel for a PDU Session", 3GPP Draft; 3-182737, 3rd Generation Partnership Project (3GPP), Mobile Competence Centre; 650 Route Des Lucioles; F-06921 Sophia-Antipolis Cedex; France, vol. RAN WG3, No. Busan, South Korea; May 20, 2018 (May 20, 2018), XP051445239 (Year: 2018).*

(Continued)

*Primary Examiner* — Mehmood B. Khan
(74) *Attorney, Agent, or Firm* — Foley & Lardner LLP

(57) ABSTRACT

Provided are a configuration method, apparatus, system and device for a data flow, and a computer medium. The configuration method for a data flow includes: when the first network element needs to offload part of QFs in a PDU Session to a second network element for transmission, a request message is sent to the second network element, where the request message carries an uplink interface address on a core network side; the second network element receives the request message sent by the first network element, and obtains, according to the request message, the uplink interface address on the core network side required for a QF offloaded to the second network element.

16 Claims, 8 Drawing Sheets

Related U.S. Application Data continuation of application No. PCT/CN2019/091538, filed on Jun. 17, 2019.

(56) References Cited

U.S. PATENT DOCUMENTS

| | | | | |
|---|---|---|---|---|
| 2015/0195748 | A1* | 7/2015 | Uchino | H04W 76/19 370/331 |
| 2016/0286451 | A1* | 9/2016 | Ahmad | H04W 36/12 |
| 2017/0303287 | A1* | 10/2017 | Yu | H04W 72/542 |
| 2018/0317137 | A1* | 11/2018 | Loehr | H04L 1/1614 |
| 2018/0324631 | A1* | 11/2018 | Jheng | H04L 1/1887 |
| 2019/0149421 | A1* | 5/2019 | Jin | H04L 1/0061 370/331 |
| 2019/0174377 | A1* | 6/2019 | Decarreau | H04W 28/06 |
| 2019/0373666 | A1* | 12/2019 | Khan | G06F 9/45558 |
| 2020/0029389 | A1* | 1/2020 | Yilmaz | H04W 8/08 |
| 2020/0059817 | A1* | 2/2020 | Baek | H04W 28/0273 |
| 2020/0113012 | A1* | 4/2020 | Lee | H04W 24/10 |
| 2020/0154499 | A1* | 5/2020 | Futaki | H04W 76/15 |
| 2020/0404732 | A1* | 12/2020 | Shi | H04W 48/16 |
| 2021/0289402 | A1* | 9/2021 | Ke | H04W 28/0263 |

FOREIGN PATENT DOCUMENTS

| | | | | |
|---|---|---|---|---|
| CN | 105052197 A | | 11/2015 | |
| CN | 105357739 A | | 2/2016 | |
| CN | 106162735 A | | 11/2016 | |
| CN | 107018542 A | | 8/2017 | |
| EP | 3641395 B1 | * | 9/2021 | H04W 36/13 |
| WO | WO-2017/118225 A1 | | 7/2017 | |
| WO | WO-2018/062949 A1 | | 4/2018 | |
| WO | WO-2019160546 A1 | * | 8/2019 | H04W 48/17 |

OTHER PUBLICATIONS

Ericsson et al., "Potentials of RAN UP network function virtualisation" 3GPP TSG-RAN WG3 Meeting #99bis, R3-182179, Apr. 20, 2018, Sanya, P.R. China (7 pages).

Ericsson, "Establishing a second NG-U tunnel for a PDU Session" 3GPP TSG-RAN WG3 Meeting #100, R3-182737, May 25, 2018, Busan, South Korea (15 pages).

Ericsson: "Establishing a Second NG-U Tunnel for a PDU Session" 3GPP TSG-RAN WG3 #99bis Meeting R3-182176, Apr. 20, 2018 (Apr. 20, 2018); Sanya, China (16 pages).

Ericsson: "Establishing a second NG-U tunnel for a PDU Session" 3GPP TSG-RAN WG3 Meeting #99; R3-181264; Mar. 2, 2018; Athens, Greece (16 pages).

Ericsson: "PDU Session Split at UPF" 3GPP TSG-RAN WG3 Meeting #99; R3-181266; Mar. 2, 2018; Athens, Greece (3 pages).

Extended European Search Report for EP Appl. No. 19821768.9, dated Feb. 17, 2022 (10 pages).

First Office Action for CN Appl. No. 2021103006673, dated Oct. 27, 2021, (with English translation, 31 pages).

International Search Report and Written Opinion for PCT Appl. No. PCT/CN2019/091538 mailed Sep. 12, 2019 (with English translation, 8 pages).

First Office Action on CN Appl. No. 201810645453.8 dated May 22, 2026 (22 pages with English translation).

* cited by examiner

METHOD, APPARATUS, SYSTEM AND DEVICE FOR CONFIGURING DATA STREAM, AND COMPUTER MEDIUM

CROSS-REFERENCE TO RELATED APPLICATIONS

This application claims the benefit of priority under 35 U.S.C. § 120 as a continuation of U.S. patent application Ser. No. 17/123,988, filed on Dec. 16, 2020, which claims benefit of priority under 35 U.S.C. § 120 as a continuation of International Patent Application No. PCT/CN2019/091538, filed on Jun. 17, 2019, which claims priority to Chinese Patent Application No. 201810645453.8 filed on Jun. 21, 2018, the disclosures of which are incorporated herein by reference in their entirety.

TECHNICAL FIELD

The present application relates to the field of wireless communications technologies, and in particular, to a configuration method, apparatus, system and device for a data flow, and a computer medium.

BACKGROUND

FIG. 1 is a schematic diagram of an architecture of a dual connectivity (DC) system in the related art. In FIG. 1, an access and mobility management function (AMF) and a user plane function (UPF) are located in a 5GC core Network, and NG-RAN is short for next generation radio access network. As shown in FIG. 1, in the dual connectivity system using the 5GC as a core network, a radio access network node between which and the 5GC a control plane interface (next generation-control (NG-C)) is established is referred to as a master node (MN), and another node providing additional radio resources for a user equipment (UE) is referred to as a secondary node (SN), and a user plane interface (NG-U) between the SN and the 5GC is optional. The MN is responsible for major and comprehensive radio resource management including but not limited to making an offloading policy; and under coordination with the MN, the SN is mainly responsible for radio resource management on a secondary cell group (SCG) side.

FIG. 2 is a schematic diagram of a QoS architecture in the related art. As shown in FIG. 2, in the QoS architecture of the 5GC, user plane data belongs to a protocol data unit (PDU) Session in a form of a QoS flow (QF), one PDU Session includes at least one QF, and one UE establishes at least one PDU Session. For a certain PDU Session, the MN determines whether some QFs are offloaded to the SN and which QFs need to be offloaded specifically. When in a PDU Session, at least one QF is transmitted on the MN and at least another QF is transmitted on the SN, the PDU Session is referred to as a split PDU Session in the present application, referring to PDU Session-1 in FIG. 2 (*a*), and at this time, 5GC (the UPF) establishes one GPRS tunnel protocol user (GTP-U) tunnel with each of the MN and the SN respectively; otherwise, all QFs of a certain PDU Session are transmitted on only one network element, referring to PDU Session-2 in FIG. 2(*b*), the PDU Session is referred to as a non-split PDU Session in the present application, and at this time, the 5GC only establishes one GTP-U tunnel with the network element (the MN or the SN) transmitting the PDU Session.

Further, in the DC system, a mapping relationship between a QF and a radio data bearer (DRB) is determined by a network element of a radio access network where the QF is located, that is, a network element where a service data adaptation protocol (SDAP) corresponding to the QF is located. In the related art, if the UE reconfigures the mapping relationship in a same cell, for uplink data, the UE will transmit all existing packets in the original L2 protocol stack completely, and then transmit according to the new mapping relationship; for the last data packet in the original mapping relationship, the SDAP will perform a tail packet marker (marked as End Marker) on the last data packet. The design of the scheme aims to ensure that a receiving end can receive data packets in a lossless and sequential manner.

Therefore, how to configure the non-split PDU Session as the split PDU Session is an urgent technical problem to be solved.

SUMMARY

In view of the above problems, the embodiments of the present disclosure provide a configuration method, apparatus, system and device for a data flow, and a computer medium to solve the problems.

According to an aspect of the embodiments of the present disclosure, a configuration method for a data flow is provided. The method is applied to a first network element and includes a step described below.

When the first network element needs to offload part of QFs in a PDU session to a second network element for transmission, a request message is sent to the second network element, where the request message carries an uplink interface address on a core network side.

According to another aspect of the embodiments of the present disclosure, a configuration method for a data flow is provided. The method is applied to a second network element and includes steps described below.

A request message sent by a first network element is received.

An uplink interface address, which is required by a QF offloaded to the second network element, on a core network side is obtained according to the request message.

According to a third aspect of the embodiments of the present disclosure, a configuration apparatus for a data flow is provided. The apparatus is applied to a first network element and includes a sending module.

The sending module is configured to: in a case where the first network element needs to offload part of QFs in a PDU Session to a second network element for transmission, send a request message to the second network element, where the request message carries an uplink interface address on a core network side.

According to a fourth aspect of the embodiments of the present disclosure, a configuration apparatus for a data flow is provided. The apparatus is applied to a second network element and includes a receiving module and a processing module.

The receiving module is configured to receive a request message sent by a first network element.

The processing module is configured to obtain, according to the request message, an uplink interface address, which is required for a QF offloaded to the second network element, on a core network side.

According to a fifth aspect of the embodiments of the present disclosure, a configuration system for a data flow is provided. The system includes the above-mentioned configuration apparatus for a data flow disposed in the first network element, and the above-mentioned configuration apparatus for a data flow disposed in the second network element.

According to a sixth aspect of the embodiments of the present disclosure, a computer-readable storage medium is provided. The computer-readable storage medium is configured to store a computer program for implementing, when executed by a processor, steps of the above-mentioned configuration method for a data flow applied to the first network element or steps of the above-mentioned configuration method for a data flow applied to the second network element.

According to a seventh aspect of the embodiments of the present disclosure, a configuration device for a data flow is provided. The configuration device for a data flow includes a memory, a processor, and a computer program stored in the memory and capable of running on the processor, where the computer program is executed by the processor to implement steps of the above-mentioned configuration method for a data flow applied to the first network element or steps of the above-mentioned configuration method for a data flow applied to the second network element.

The embodiments of the present disclosure have the following beneficial effects:

In the configuration method, apparatus, system and device for a data flow, and the computer medium provided by the embodiments of the present disclosure, when the first network element needs to offload part of the QFs in the PDU Session to the second network element for transmission, the request message sent to the second network element carries the uplink interface address on the core network side, so that the second network element can obtain the uplink interface address, which is required by the QF offloaded to the second network element, on the core network side, the PDU Session can obtain active address configuration, and the non-split PDU Session is configured as the split PDU Session.

DETAILED DESCRIPTION

Exemplary embodiments of the present application will be described in detail with reference to the drawings. The drawings illustrate the exemplary embodiments of the present application, but it should be understood that the present application may be implemented in many ways and should not be limited to the embodiments set forth herein. On the contrary, these embodiments are provided for a thorough understanding of the present application and to fully convey the scope of the present application to those skilled in the art. It is to be understood that the specific embodiments described herein are intended to explain and not to limit the present application.

According to a first embodiment of the present application, a configuration method for a data flow is provided and is applied to a first network element. The configuration method for a data flow according to the first embodiment of the present application includes step a step described below.

When the first network element needs to offload part of QFs in a PDU Session to a second network element for transmission, a request message is sent to the second network element, where the request message carries an uplink interface address on a core network side.

In the embodiment of the present disclosure, the first network element may be a MN or a SN. The uplink interface address is an interface address between a core network and an access network.

In the configuration method for a data flow according the first embodiment of the present disclosure, when the first network element needs to offload part of the QFs in the PDU Session to the second network element for transmission, the request message sent to the second network element carries the uplink interface address on the core network side, so that the second network element can obtain the uplink interface address on the core network side required by the QF offloaded to the second network element, the PDU Session can obtain active address configuration in the DC system, and the non-split PDU Session is configured as the split PDU Session.

According to a second embodiment of the present application, a configuration method for a data flow is provided and is applied to a first network element. In the second embodiment of the present application, the first network element is a MN and the second network element is a SN.

Figure 1:
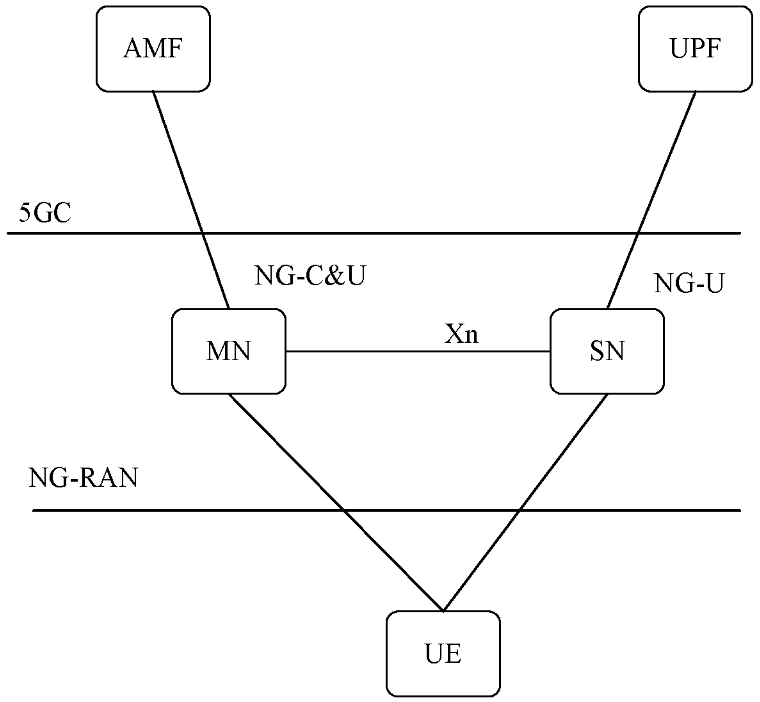
FIG. 1 is a schematic diagram of an architecture of a dual connectivity system in the related art.
Figure 2:
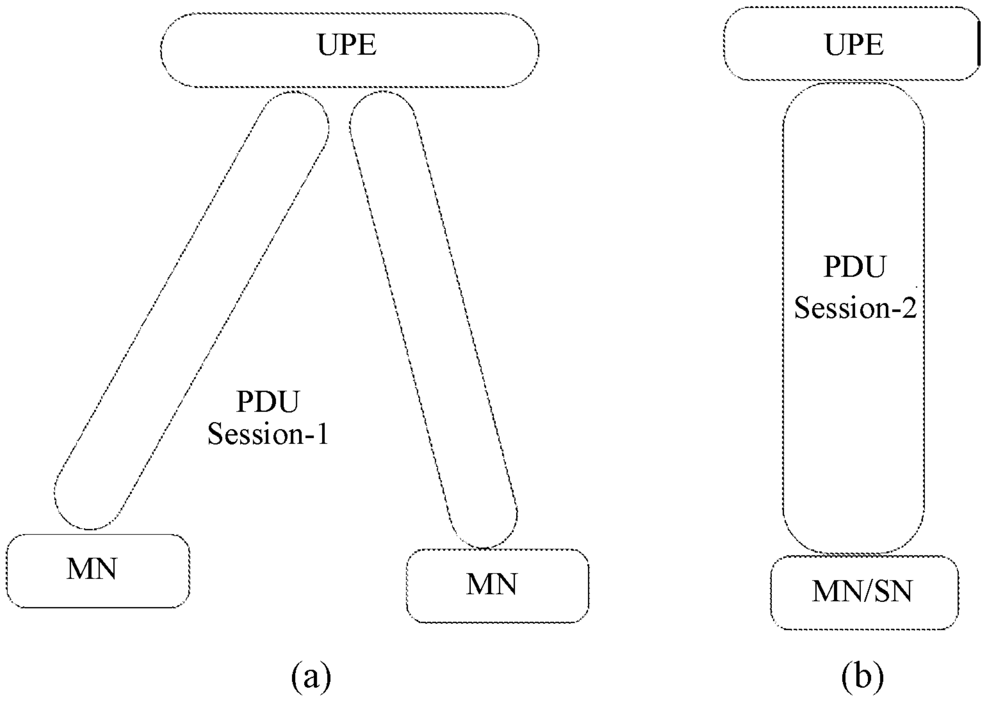
FIG. 2 is a schematic diagram of a QoS architecture in the related art.
Figure 3:
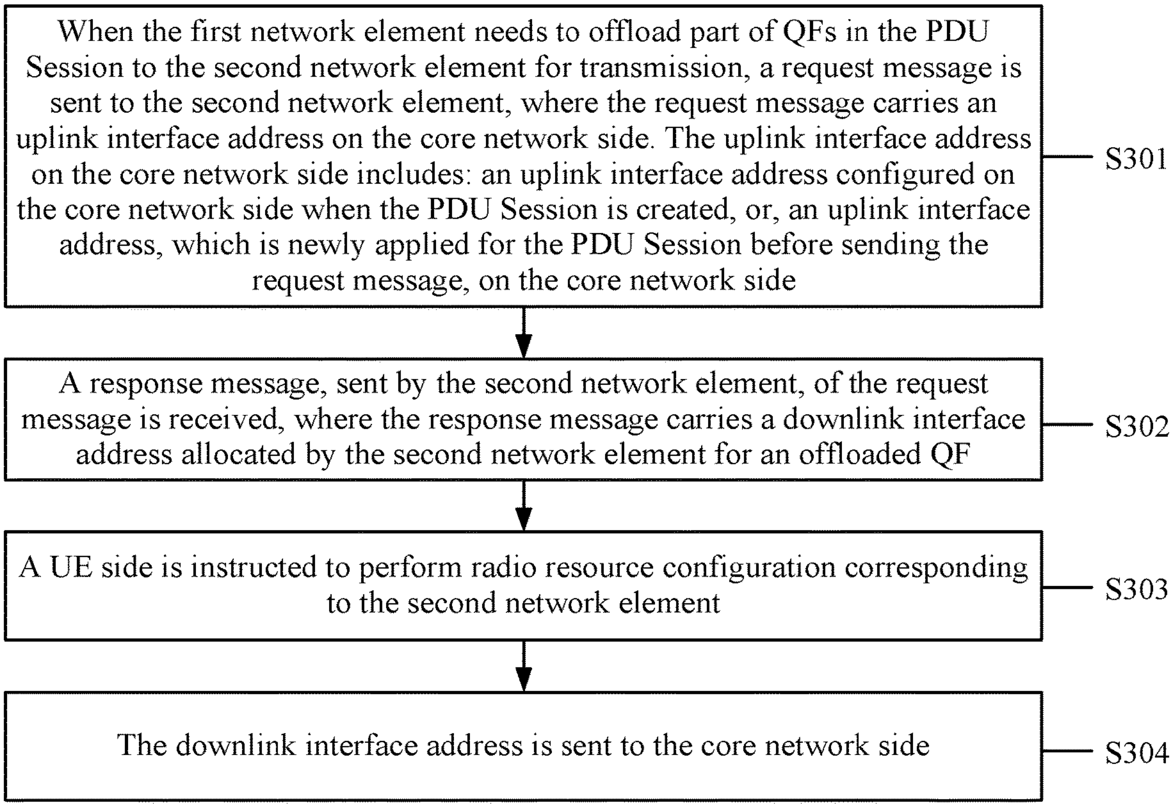
FIG. 3 is a flowchart of a configuration method for a data flow according to a second embodiment of the present application.

FIG. 3 is a flowchart of a configuration method for a data flow according to the second embodiment of the present application. As show in FIG. 3, the configuration method for a data flow according to the second embodiment of the present application includes steps described below.

In S301, when the first network element needs to offload part of QFs in the PDU Session to the second network element for transmission, a request message is sent to the second network element, where the request message carries an uplink interface address on the core network side. The uplink interface address on the core network side includes: an uplink interface address configured on the core network side when the PDU Session is created, or, an uplink interface address, which is newly applied for the PDU Session before sending the request message, on the core network side.

As an optional implementation manner, the step in which the uplink interface address on the core network side is newly applied for the PDU Session includes steps described below. A first address application message is sent to the core network; the uplink interface address newly allocated to the PDU Session and sent by the core network is received.

Exemplarily, creating the PDU Session includes the steps described below.

When a request message, sent by the core network, for creating a PDU Session is received, a DRB for transmitting the PDU Session between the UE and the first network element is determined, where the request message for creating the PDU Session carries the uplink interface address configured by the core network for the PDU Session.

An indication message is sent to the UE to instruct the UE to perform radio resource configuration related to the DRB.

After a feedback message, sent by the UE, of the indication message is received, a response message of the request message for creating the PDU Session is sent to the core network, and the response message carries the downlink interface address configured by the first network element for the PDU Session.

In S302, a response message, sent by the second network element, of the request message is received, where the response message carries a downlink interface address allocated by the second network element for an offloaded QF.

In S303, a UE side is instructed to perform radio resource configuration corresponding to the second network element.

As an optional implementation manner, after the UE side is instructed to perform radio resource configuration corresponding to the second network element, the configuration method for a data flow further includes the following steps: before the UE side completes the radio resource configuration corresponding to the second network element, a transmission of data packets continues to be performed through a DRB established by the first network element for the offloaded QF. After the UE side completes the radio resource configuration corresponding to the second network element and synchronizes with the second network element, the DRB established by the second network element for the offloaded QF is obtained, and the data packets of the offloaded QF start to be transmitted on the DRB.

Optionally, when the offloaded QF is transmitted through the DRB of the first network element, the method further includes: when an uplink data packet is detected to carry a tail packet marker of the offloaded QF, an indication message is sent to the second network element or the core network, so that the data packets of the offloaded QF processed in the core network are sequential.

The first network element can send the indication message to the second network element or the core network through a control plane or a user plane.

For example, when the uplink interface address on the core network side is an uplink interface address configured on the core network side when the PDU Session is created, the indication message is sent to the second network element to instruct the second network element to start uploading the received data packets of the offloaded QF to the core network, so that the data packets of the offloaded QF processed in the core network are sequential. When the uplink interface address on the core network side is an uplink interface address on the core network side newly applied for the PDU Session before sending the request message, the indication message may be sent to the second network element to instruct the second network element to start uploading the received data packets of the offloaded QF to the core network, or the indication message may also be sent to the core network (specifically, the UPF of the core network), and the UPF ensures that the data packets of the offloaded QF processed in the core network are sequential.

Optionally, the step in which the indication message is sent to the second network element or the core network may use one of the following two schemes: the indication message is sent for each of offloaded QFs respectively, or, a joint indication message is sent to the second network element or the core network for offloaded QFs.

In S304, the downlink interface address is sent to the core network side.

As a specific implementation manner, when the uplink interface address on the core network side is the uplink interface address configured on the core network side when the PDU Session is created, after sending the downlink interface address to the core network side, the method further includes: an uplink interface address returned by the core network is received, and the returned uplink interface address is sent to the second network element, where the returned uplink interface address is an uplink interface address newly allocated to the PDU Session by the core network.

In the configuration method for a data flow provided in the second embodiment of the present application, when the first network element is the MN and the second network element is the SN, by carrying the uplink interface address configured on the core network side when the PDU Session was created in the request message sent to the second network element, or the uplink interface address, which is newly applied for the PDU Session before sending the request message, on the core network side, the PDU Session can obtain active address configuration and configure a non-split PDU Session as a split PDU Session; moreover, the first network element sends the indication message to the second network element or the core network, so that the core network can receive lossless and sequential data packets, thereby ensuring transmission performance of the user plane and satisfying communication experience of users.

According to a third embodiment of the present application, a configuration method for a data flow is provided and is applied to a first network element. In the third embodiment of the present application, the first network element is a SN and a second network element is a MN.

Figure 4:
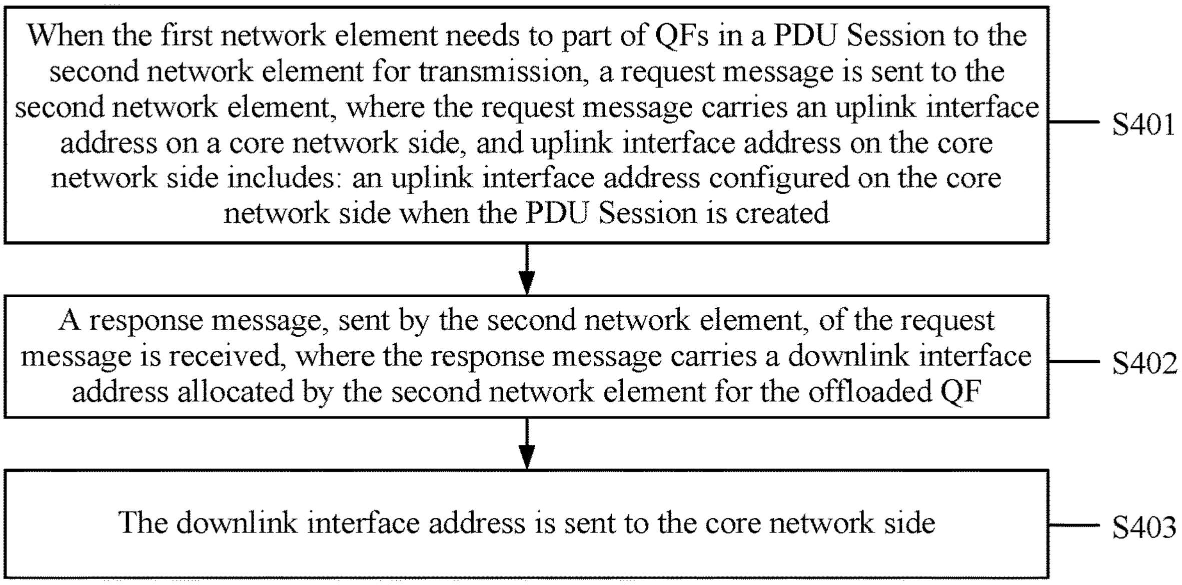
FIG. 4 is a flowchart of a configuration method for a data flow according to a third embodiment of the present application.

FIG. 4 is a flowchart of a configuration method for a data flow according to the third embodiment of the present application. As show in FIG. 4, a configuration method for a data flow according to the third embodiment of the present application includes steps described below.

In S401, when the first network element needs to part of QFs in a PDU Session to the second network element for transmission, a request message is sent to the second network element, where the request message carries an uplink interface address on a core network side, and uplink interface address on the core network side includes: an uplink interface address configured on the core network side when the PDU Session is created.

In S402, a response message, sent by the second network element, of the request message is received, where the response message carries a downlink interface address allocated by the second network element for an offloaded QF. That is, after the request message is sent to the second network element, step S402 is further included.

As an optional implementation manner, after the request message is sent to the second network element or after the response message, sent by the second network element, of the request message is received, the method further includes the following steps: before the UE side completes the radio resource configuration corresponding to the second network element, a transmission of data packets continues to be performed through a DRB established by the first network element for the offloaded QF. After the UE side completes the radio resource configuration corresponding to the second network element, the DRB established by the second network element for the offloaded QF is obtained, and the data packets of the offloaded QF are start to be transmitted on the DRB.

Optionally, when the offloaded QF is transmitted through the DRB of the first network element, the method further includes: when an uplink data packet is detected to carry a tail packet marker of the offloaded QF, an indication message is sent to the second network element, so that the data packets of the offloaded QF processed in the core network are sequential.

The first network element may send the indication message to the second network element through a control plane or a user plane.

Optionally, the step in which the indication message is sent to the second network element may use one of the following two schemes: the indication message is sent for each of offloaded QFs respectively, or, a joint indication message is sent to the second network element or the core network for offloaded QFs.

In S403, the downlink interface address is sent to the core network side.

As an optional implementation manner, after the DRB established by the second network element side for the offloaded QF is obtained, and the data packets of the offloaded QF start to be transmitted on the DRB, the downlink interface address is sent to the core network side.

In the configuration method for a data flow provided in the third embodiment of the present application, when the first network element is the SN and the second network element is the MN, by carrying the uplink interface address configured on the core network side when the PDU Session was created in the request message sent to the second network element, the PDU Session can obtain active address configuration and a non-split PDU Session is configured as a split PDU Session; moreover, the first network element sends the indication message to the second network element, so that the core network can receive lossless and sequential data packets, thereby ensuring transmission performance of the user plane and satisfying communication experience of users.

Corresponding to the first embodiment of the present application, a fourth embodiment of the present application provides a configuration method for a data flow, which is applied to the second network element. The configuration method for a data flow according to the fourth embodiment of the present application includes step a step described below.

A request message sent by the first network element is received, and an uplink interface address, which is required by a QF offloaded to the second network element, on a core network side is obtained according to the request message.

In the fourth embodiment of this application, by parsing the request message sent by the first network element, the uplink interface address, which is required by the QF, offloaded to the second network element, on the core network side is obtained, so that the PDU Session can obtain active address configuration, and a non-split PDU Session is configured as a split PDU Session.

Corresponding to the second embodiment of the present application, a fifth embodiment of the present application provides a configuration method for a data flow, which is applied to the second network element. In the fifth embodiment of the present application, the first network element is a MN and the second network element is a SN.

Figure 5:
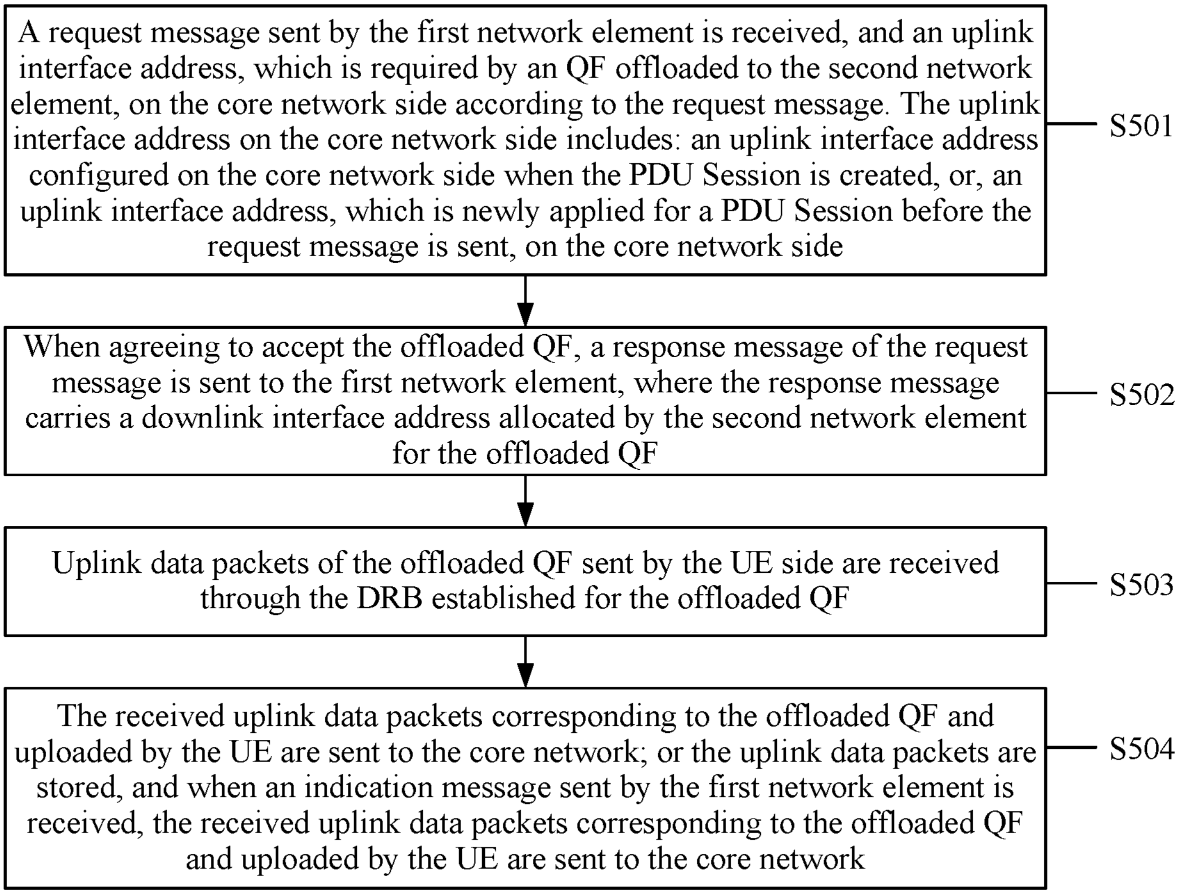
FIG. 5 is a flowchart of a configuration method for a data flow according to a fifth embodiment of the present application.

FIG. 5 is a flowchart of a configuration method for a data flow according to the fifth embodiment of the present application. As show in FIG. 5, a configuration method for a data flow according to the fifth embodiment of the present application includes steps described below.

In S501, a request message sent by the first network element is received, and an uplink interface address, which is required by an QF offloaded to the second network element, on the core network side according to the request message. The uplink interface address on the core network side includes: an uplink interface address configured on the core network side when a PDU Session is created, or, an uplink interface address, which is newly applied for a PDU Session before the request message is sent, on the core network side.

In S502, when agreeing to accept the offloaded QF, a response message of the request message is sent to the first network element, where the response message carries a downlink interface address allocated by the second network element for the offloaded QF.

In the embodiment of the present application, the downlink interface address is an interface address between the core network and an access network.

In S503, uplink data packets of the offloaded QF sent by the UE side are received through the DRB established for the offloaded QF.

In S504, the received uplink data packets corresponding to the offloaded QF and uploaded by the UE are sent to the core network; or the uplink data packets are stored, and when an indication message sent by the first network element is received, the received uplink data packets corresponding to the offloaded QF and uploaded by the UE are sent to the core network.

Exemplarily, when the uplink interface address on the core network side is an uplink interface address configured on the core network side when the PDU Session is created, the second network element firstly stores the received the uplink data packets of the offloaded QF, and when receiving the indication message sent by the first network element, the received uplink data packets corresponding to the offloaded QF and uploaded by the UE are sent to the core network, so that the data packets of the offloaded QF processed in the core network are sequential. When the uplink interface address on the core network side is an uplink interface address on the core network side newly applied for the PDU Session before the request message is sent, the second network element can firstly store the received uplink data packets of the offloaded QF, when receiving the indication message sent by the first network element, the received uplink data packets corresponding to the offloaded QF and uploaded by the UE are sent to the core network, or the received uplink data packets corresponding to the offloaded QF and uploaded by the UE are sent directly to the core network (specifically, a UPF of the core network). The indication message sent by the first network element and received by the UPF ensures that the data packets of the offloaded QF processed in the core network are sequential.

In the fifth embodiment of the present application, when the first network element is a MN and the second network element is a SN, by parsing the request message sent by the first network element, the uplink interface address on the core network side, which is required by the QF offloaded to the second network element is obtained, so that the PDU Session can obtain active address configuration, and a non-split PDU Session is configured as a split PDU Session; moreover, the second network element sends the received uplink data packets which correspond to the offloaded QF and are uploaded by the UE to the core network; or, the second network element stores the uplink data packets, and when receiving the indication message sent by the first network element, sends the received uplink data packets which correspond to the offloaded QF and are uploaded by the UE to the core network, thereby ensuring that the core network can receive lossless and sequential data packets, and satisfying communication experience of users.

Corresponding to the third embodiment of the present application, the sixth embodiment of the present application provides a configuration method for a data flow, which is applied to the second network element. In the sixth embodiment of the present application, the first network element is a SN and the second network element is a MN.

Figure 6:
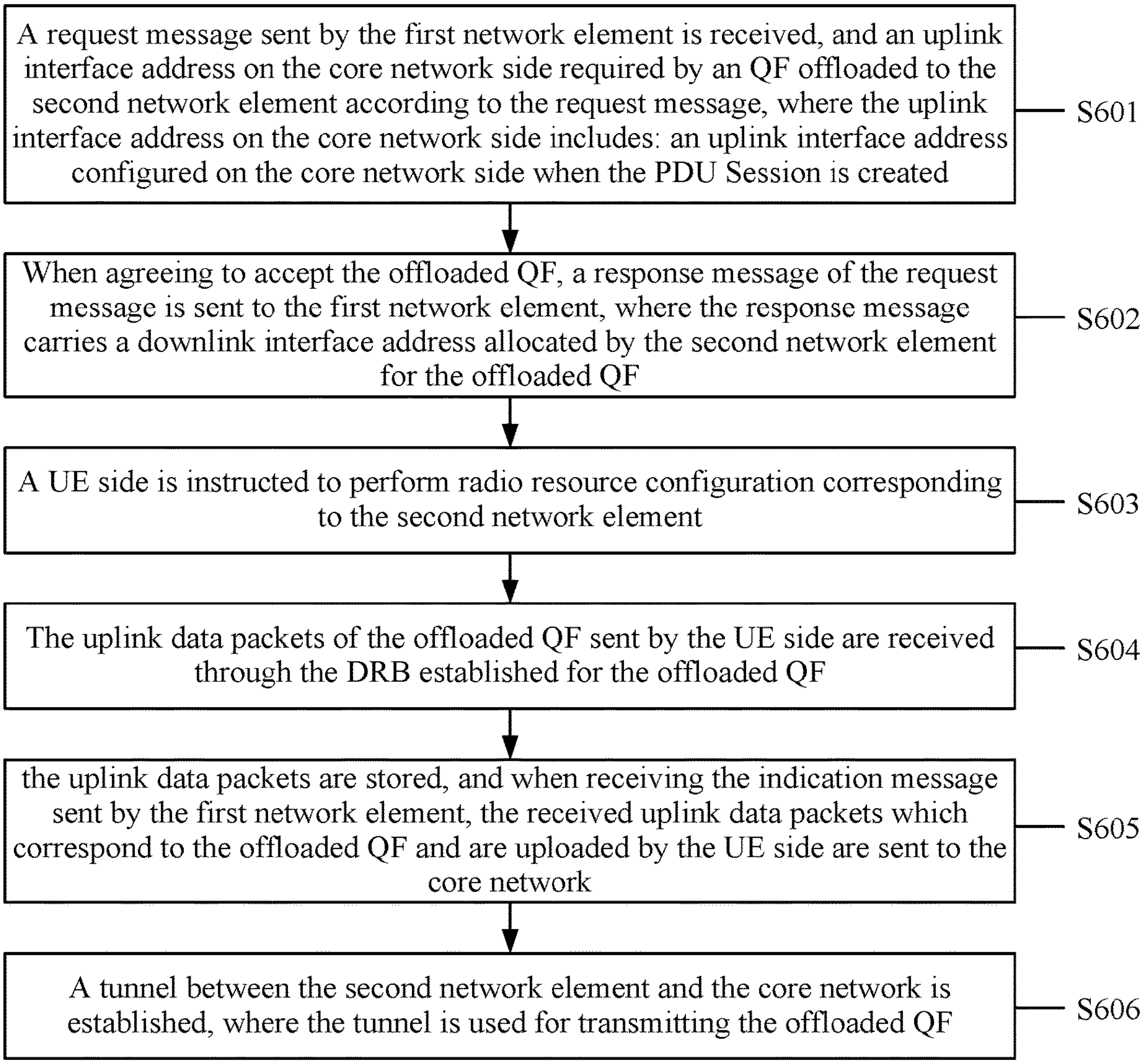
FIG. 6 is a flowchart of a configuration method for a data flow according to a sixth embodiment of the present application.

FIG. 6 is a flowchart of a configuration method for a data flow according to the sixth embodiment of the present application. As show in FIG. 6, the flowchart of a configuration method for a data flow according to the sixth embodiment of the present application includes steps described below.

In S601, a request message sent by the first network element is received, and an uplink interface address, which is required by an QF offloaded to the second network element, on the core network side according to the request message, where the uplink interface address on the core network side includes: an uplink interface address configured on the core network side when the PDU Session is created.

In S602, when agreeing to accept the offloaded QF, a response message of the request message is sent to the first network element, where the response message carries a downlink interface address allocated by the second network element for the offloaded QF.

In S603, a UE side is instructed to perform radio resource configuration corresponding to the second network element. It means that after the response message of the request message is sent to the first network element, the UE side is instructed to perform the radio resource configuration corresponding to the second network element.

In S604, the uplink data packets of the offloaded QF sent by the UE side are received through a DRB established for the offloaded QF.

In S605, the uplink data packets are stored, and when receiving the indication message sent by the first network element, the received uplink data packets which correspond to the offloaded QF and are uploaded by the UE side are sent to the core network.

It means that, the second network element firstly stores the received uplink data packets of the offload QF, and when the indication message sent by the first network element is received, the received uplink data packets corresponding to the offloaded QF and uploaded by the UE are sent to the core network, so that the data packets of the offloaded QF processed in the core network are sequential.

In S606, a tunnel between the second network element and the core network is established, where the tunnel is used for transmitting the offloaded QF.

As a specific implementation manner, the step in which the tunnel used for transmitting the offloaded QF between the second network element and the core network is established includes the following steps: a second address application message is sent to the core network, where the second address application message carries a downlink interface address allocated by the second network element for the offloaded QF; and an uplink interface address newly allocated for the PDU Session and returned by the core network is received.

In the sixth embodiment of the present application, when the first network element is a SN and the second network element is a MN, by parsing the request message sent by the first network element, the uplink interface address which is required by the QF offloaded to the second network element, on the core network side is obtained, so that the PDU Session can obtain active address configuration, and a non-split PDU Session is configured as a split PDU Session; moreover, the second network element stores the uplink data packets, and when receiving the indication message sent by the first network element, the second network element sends the received uplink data packets which correspond to the offloaded QF and are uploaded by the UE to the core network, thereby ensuring that the core network can receive lossless and sequential data packets and satisfying communication experience of users.

Corresponding to the methods of the first embodiment to the third embodiment of the present application, the seventh embodiment of the present application provides a configuration apparatus for a data flow, which is applied to a first network element. The configuration apparatus for a data flow according to the seventh embodiment of the present application includes a sending module, which is described in detail below.

The sending module is configured to: when the first network element needs to offload part of QFs in a PDU Session to a second network element for transmission, send a request message to the second network element, where the request message carries an uplink interface address on a core network side.

As a first specific implementation manner, when the first network element is a MN and the second network element is a SN, the step in which the request message carries the uplink interface address on the core network side includes: an uplink interface address configured on a core network side when the PDU Session is created, or an uplink interface address, which is newly applied for the PDU Session before sending the request message, on the core network side.

In a case where the first specific implementation manner is used, after sending the request message to the second network element, the configuration apparatus for a data flow according to the seventh embodiment of the present application further implements the following steps: a response message, sent by the second network element, of the request message is received, where the response message carries a downlink interface address allocated by the second network element for the offloaded QF; and the UE side is instructed to carry out radio resource configuration corresponding to the second network element; the downlink interface address is sent to the core network side.

In a case where the first specific implementation manner is used and the request message carries the uplink interface address configured on the core network side when the PDU Session is created, after sending the downlink interface address to the core network side, the configuration apparatus for a data flow according to the seventh embodiment of the present application further implements the following steps: an uplink interface address returned by the core network is received, and the returned uplink interface address is sent to the second network element, where the returned uplink interface address is an uplink interface address newly allocated to the PDU Session by the core network.

As a specific implementation manner, the configuration apparatus for a data flow according to the seventh embodiment of the present application further implements the following steps: a first address application message is sent to the core network; and an uplink interface address which is newly allocated for the PDU Session and sent by the core network is received.

In a case where the above-mentioned first specific implementation manner is used, after instructing the UE side to perform radio resource configuration corresponding to the second network element, the configuration apparatus for a data flow according to the seventh embodiment of the present application further implements the following steps:

after the UE side completes the radio resource configuration corresponding to the second network element and synchronizes with the second network element, obtaining the DRB established by the second network element side for the offloaded QF, and starting to transmit the data packets of the offloaded QF on the DRB.

In a case where the above-mentioned first specific implementation manner is used, after instructing the UE side to perform radio resource configuration corresponding to the second network element, the configuration apparatus for a data flow according to the seventh embodiment of the present application further implements the following steps: before the UE side completes the radio resource configuration corresponding to the second network element, a transmission of data packets continues to be performed through the DRB established by the first network element for the offloaded QF.

In a case where the above-mentioned first specific implementation manner is used, the configuration apparatus for a data flow according to the seventh embodiment of the present application transmits the offloaded QF through the DRB of the first network element further implements the following steps: when an uplink data packet is detected to carry a tail packet marker of the offloaded QF, an indication message is sent to the second network element or the core network, so that the data packets of the offloaded QF processed in the core network are sequential.

In a case where the above-mentioned first specific implementation manner is used, optionally, in order to send the indication message to the second network element or the core network, the configuration apparatus for a data flow according to the seventh embodiment of the present application specifically implements the following steps: the indication message is respectively sent to each of offloaded QFs, or, a joint indication message is sent to the second network element or the core network for offloaded QFs.

In a case where the above-mentioned first specific implementation manner is used, optionally, in order to send the indication message to the second network element or the core network, the configuration apparatus for a data flow according to the seventh embodiment of the present application specifically implements the following steps: the indication message is sent to the second network element or the core network through the control plane or the user plane.

As the second specific implementation manner, when the first network element is a SN and the second network element is a MN, that the request message carries the uplink interface address on the core network side includes: an uplink interface address configured on the core network side when the PDU Session is created.

In a case where the second specific implementation manner is used, after sending the request message to the second network element, the configuration apparatus for a data flow according to the seventh embodiment of the present application further implements the following steps: a response message, sent by the second network element, of the request message is received, where the response message carries a downlink interface address allocated by the second network element for the offloaded QF; and the downlink interface address is sent to the core network side.

In a case where the second specific implementation manner is used, after sending the request message to the second network element or receiving the response message of the request message sent by the second network element, the configuration apparatus for a data flow according to the seventh embodiment of the present application further implements the following steps: after the UE side completes the radio resource configuration corresponding to the second network element, the radio DRB established by the second network element side for the offloaded QF is obtained, and the data packets of the offloaded QF start to be transmitted on the DRB.

In a case where the second specific implementation manner is used, after sending the request message to the second network element or receiving the response message of the request message sent by the second network element, the configuration apparatus for a data flow according to the seventh embodiment of the present application further implements the following steps: before the UE side completes the radio resource configuration corresponding to the second network element, the transmission of the data packets continues to be performed through a DRB established by the first network element for the offloaded QF.

In a case where the above-mentioned second specific implementation manner is used and configuration apparatus for a data flow according to the seventh embodiment of the present application transmits the offloaded QF through the DRB of the first network element, the configuration apparatus for a data flow further implements the following steps: when an uplink data packet is detected to carry a tail packet marker of the offloaded QF, an indication message is sent to the second network element or the core network, so that the data packets of the offloaded QF processed in the core network are sequential.

In a case where the above-mentioned second specific implementation manner is used, in order to send the indication message to the second network element or the core network, the configuration apparatus for a data flow according to the seventh embodiment of the present application specifically implements the following steps: the indication message is respectively sent to each of offloaded QFs, or, a joint indication message is sent to the second network element or the core network for offloaded QFs.

In a case where the above-mentioned first specific implementation manner is used, optionally, in order to send the indication message to the second network element or the core network, the configuration apparatus for a data flow according to the seventh embodiment of the present application specifically implements the following steps: the indication message is sent to the second network element or the core network through the control plane or the user plane.

Optionally, in the configuration apparatus for a data flow described in the seventh embodiment of the present application, each the uplink interface address and the downlink interface address is an interface address between the core network and the access network.

It should be noted that the configuration apparatus for a data flow according to the seventh embodiment of the present application can implement the steps of the configuration method for a data flows described in the first embodiment to the third embodiment, and can implement the same technical effect, which is not described repeatedly herein.

Corresponding to the methods of the fourth embodiment to the sixth embodiment of the present application, an eighth embodiment of the present application provides a configuration apparatus for a data flow, which is applied to a second network element. The configuration apparatus for a data flow according to the eighth embodiment of the present application includes a receiving module and a processing module, and the receiving module is described in detail below.

The receiving module is configured to receive a request message sent by a first network element.

The processing module is configured to obtain an uplink interface address, which is required by a QF offloaded to the second network element, on a core network side according to the request message.

As a first specific implementation manner, when the second network element is a SN and the first network element is a MN, the uplink interface address on the core network side includes: an uplink interface address configured on a core network side when the PDU Session is created, or an uplink interface address, which is newly applied for the PDU Session before sending the request message, on the core network side.

In a case where the first specific implementation manner is used, after obtaining the uplink interface address, which is required by the QF offloaded to the second network element, on the core network side, the configuration apparatus for a data flow according to the eighth embodiment of the present application further implements the following steps: when accepting the offloaded QF is permitted, a response message of the request message is sent to the first network element, and the response message carries the downlink interface address allocated by the second network element for the offload QF.

In a case where the first specific implementation manner is used, after sending the response message agreeing to accept the offloaded QF to the first network element, the configuration apparatus for a data flow according to the eighth embodiment of the present application further implements the following steps: the uplink data packets of the offloaded QF sent by the UE side are received through the DRB established for the offloaded QF.

In a case where the first specific implementation manner is used, the configuration apparatus for a data flow according to the eighth embodiment of the present application further implements the following steps: the received uplink data packets corresponding to the offloaded QF and uploaded by the UE are sent to the core network; or the uplink data packets are stored, and when an indication message sent by the first network element is received, the received uplink data packets corresponding to the offloaded QF and uploaded by the UE are sent to the core network.

As the second specific implementation manner, when the second network element is a MN and the first network element is a SN, the uplink interface address on the core network side includes: an uplink interface address configured on the core network side when the PDU Session is created.

In a case where the second specific implementation manner is used, after obtaining the uplink interface address, which is required by a QF offloaded to the second network element, on the core network side, the configuration apparatus for a data flow according to the eighth embodiment of the present application further implements the following steps: when agreeing to accept the offloaded QF, a response message of the request message is sent to the first network element, and the response message carries the downlink interface address allocated by the second network element for the offload QF.

In a case where the second specific implementation manner is used, after obtaining the uplink interface address, which is required by the QF offloaded to the second network element, on the core network side or after sending the response message of the request message to the first network element, the configuration apparatus for a data flow according to the eighth embodiment of the present application further implements the following steps: the UE side is instructed to perform radio resource configuration corresponding to the second network element; and a tunnel used for transmitting the offloaded QF between the second network element and the core network is established.

In a case where the second specific implementation manner is used, after the UE side is instructed to perform the radio resource configuration corresponding to the second network element, the configuration apparatus for a data flow according to the eighth embodiment of the present application further implements the following steps: the uplink data packets of the offloaded QF sent by the UE side are received through the DRB established for the offloaded QF.

In a case where the second specific implementation manner is used, further, the configuration apparatus for a data flow according to the eighth embodiment of the present application further implements the following steps: the uplink data packets are stored, and when the indication message sent by the first network element is received, the received uplink data packets which correspond to the offload QF and are uploaded by the UE are sent to the core network.

Optionally, in order to establish the tunnel used for transmitting the offloaded QF between the second network element and the core network, the configuration apparatus for a data flow according to the eighth embodiment of the present application specifically implements the following steps: a second address application message is sent to the core network, where the second address application message carries a downlink interface address allocated by the second network element for the offloaded QF; an uplink interface address newly allocated for the PDU Session and returned by the core network is received.

In the configuration apparatus for a data flow described in the eighth embodiment of the present application, each of the uplink interface address and the downlink interface address is an interface address between the core network and the access network.

It should be noted that the configuration apparatus for a data flow of the eighth embodiment of the present application can implement the steps of the configuration method for a data flows described in the fourth embodiment to the sixth embodiment, and can implement the same technical effect, which is not described repeatedly herein.

According to a ninth embodiment of the present application, a configuration system for a data flow is provided. The system includes the configuration apparatus for a data flow disposed in the first network element according to the seventh embodiment, and the flow configuration apparatus disposed in the second network element according to the eighth embodiment.

According to a tenth embodiment of the present application, a configuration device for a data flow is provided. The configuration device for a data flow includes: a memory, a processor, and a computer program stored in the memory and capable of running on the processor. When executed by the processor, the computer program performs steps of the configuration method for a data flows applied to the first network element described in the first embodiment to the third embodiment, or steps of the configuration method for a data flows applied to the second network element described in the fourth embodiment to the sixth embodiment, which can also have the same technical effects and will not be repeated herein.

According to an eleventh embodiment of the present application, a computer-readable storage medium is provided. The computer-readable storage medium store a computer program, When executed by the processor, the computer program performs steps of the configuration method for a data flows applied to the first network element described in the first embodiment to the third embodiment, or steps of the configuration method for a data flows applied to the second network element described in the fourth embodiment to the sixth embodiment, which can also have the same technical effects and will not be repeated herein. The computer-readable storage medium includes, but is not limited to: a read-only memory (ROM), a random access memory (RAM), a magnetic disk, an optical disk, or the like.

In order to describe the technical schemes of the present application in more detail, the following embodiments are given.

Embodiment 1

The scenario described in this embodiment is: when a UE has not been configured in a DC state, that is, when the UE has at most access to the first network element (in this embodiment, the first network element is a MN), the core network instructs the first network element to establish a PDU Session; at any moment during the data transmission of the PDU Session, the first network element decides to add a second network element (in this embodiment, the second network element is a SN) for the UE, and at least one QF in the PDU Session is offloaded to the second network element for transmission, and the remaining at least one QF remains in the first network element to continue transmission.

The scheme described in this embodiment is: in the process of adding the second network element, the first network element uses the known uplink address (that is, an uplink interface address on the core network side when creating the PDU Session) allocated by the core network side is carried in an adding request message sent to the second network element; in addition, the first network element and the second network element interact through interface information to ensure that the uplink data packets delivered to the core network are sequential.

Figure 7:
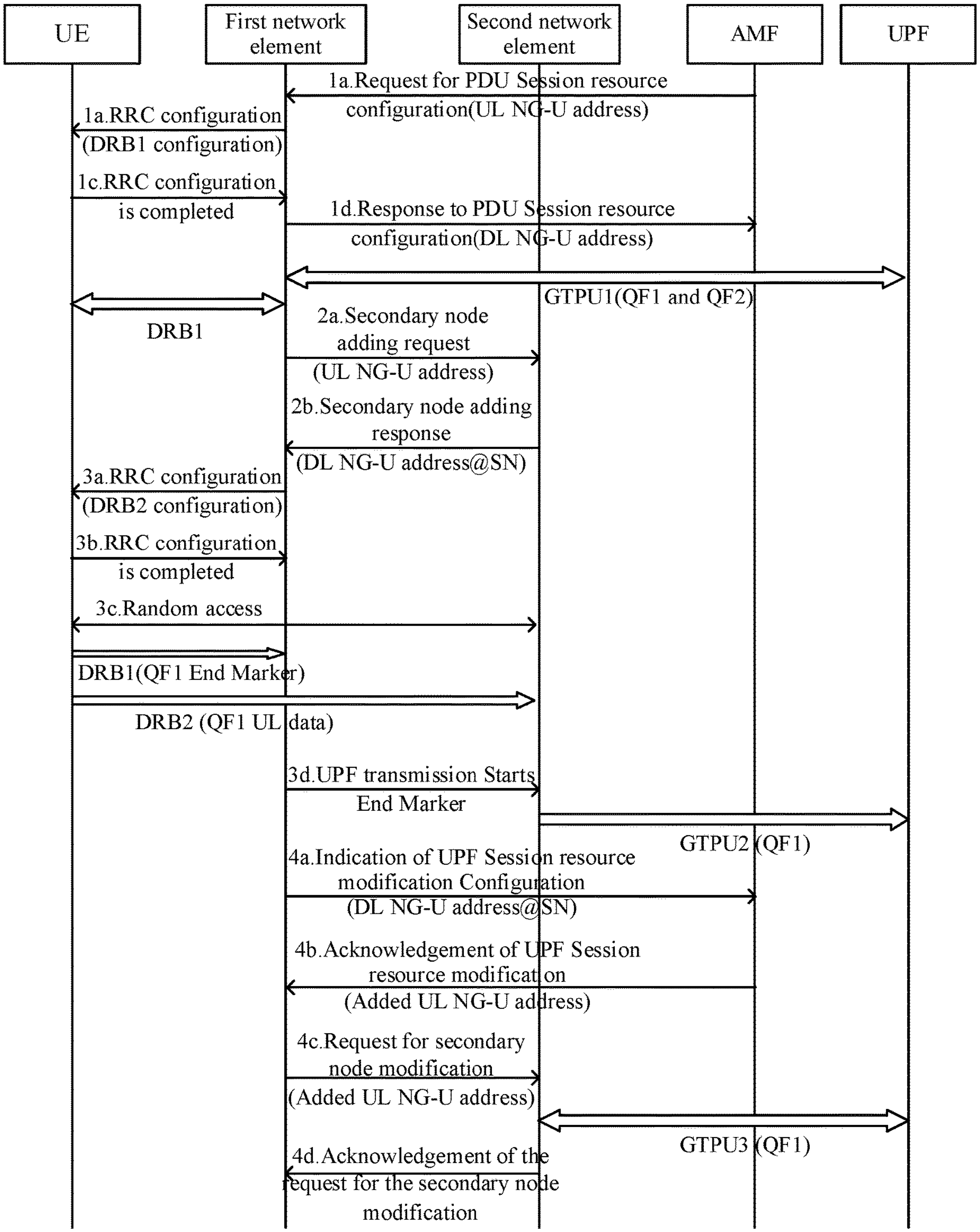
FIG. 7 is a flowchart of a configuration method for a data flow according to embodiment 1 of the present disclosure.

FIG. 7 is a flowchart of a configuration method for a data flow according to embodiment 1 of the present disclosure. As show in FIG. 7, the configuration method for a data flow according to the embodiment 1 of the present disclosure includes steps described below.

In step 1, an AMF entity in the core network sends a message 1*a* (such as a PDU SESSION RESOURCE SETUP REQUEST message) to the first network element to instruct the first network element to establish at least one PDU Session (in this embodiment, taking that a PDU Session is established and that the PDU Session includes two QFs denoted as QF1 and QF2 as an example) for the UE; the message 1*a* carries an uplink NG-U interface address (UL NG-U Address) configured on the UPF for the PDU Session.

After receiving the message 1*a*, the first network element performs a radio resource configuration decision, and the decision includes configuring the PDU Session as a non-split form and mapping two QFs on a DRB (denoted as DRB1); the first network element sends a message 1*b* (such as RRC Reconfiguration) to the UE to instruct the UE to perform radio resource configuration related to the DRB1, where RRC is short for radio resource control.

After receiving the message 1*c* (such as RRC ReconfigurationComplete) fed back by the UE, the first network element replies to the AMF with a response message id (such as PDU SESSION RESOURCE SETUP RESPONSE) corresponding to the message 1*a*, and the message id carries a downlink NG-U interface address (DL NG-U Address) configured for the PDU Session by the first network element.

Thus, a GTP-U tunnel established on the NG interface for data transmission of the PDU Session completes the information exchange (denoted as GTPU1), and data packets of the QF1 and the QF2 can be transmitted.

In Note1, procedure of the step 1 is applicable to a UE that is already in the RRC_Connected state, and also applicable to triggering the UE to enter the RRC_Connected state from the RRC_Idle state or the RRC_Inactive state.

In Note2, names of the messages and programs described in this embodiment are only examples, not limitations; other information elements included in the message can be referred to the protocol in related art, for example the NG interface program (PDU Session Resource Setup) can be referred to TS 38.413 v0.8.0 and the RRC signaling program can be referred to TS 38.331 f10.

In step 2, during the data transmission process, the first network element decides to add a second network element, and offloads the QF1 in the PDU Session to the second network element to continue transmission, that is, reconfigure the PDU Session to a split form; In terms of a bearer type, this embodiment is mainly limited to a SN terminated type of bearer (that is, a bearer terminated on the secondary node), and how the bottom layer is transmitted (that is, master cell group (MCG)/secondary cell group (SCG)/split DRB) is not limited. In the message 2*a* (such as S-NODE ADDITION REQUEST, that is, a secondary node addition request message) sent to the second network element, for a required information element UL NG-U UP TNL at UPF, the first network element fills known uplink address information, that is UL NG-U Address, where TNL represents the transport network layer.

If the second network element agrees to accept the requested resource (that is, the radio resource corresponding to the QF1), the second network element determines the DRB (denoted as DRB2 here) to which the QF1 is mapped and replies to the first network element with a message 2*b* (such as S-NODE ADDITION REQUEST ACKNOWLEDGE), the message 2*b* carries the DL NG-U Address (denoted as DL NG-U Address @SN) allocated for the QF1 (that is, the PDU Session) by the second network element.

The program (such as S-NG-RAN node Addition Preparation) performed in step 2 can be referred to TS 38.423 v0.8.0. It should be noted that this embodiment takes the program of adding the second network element as an example, but the scheme can also be applied to UE already in the DC state (at this time, the M-NG-RAN node initiated S-NG-RAN node Modification Preparation program may be performed), and merely no resource has been established on the second network element side before the PDU Session.

In step 3, the first network element sends a RRC message 3*a* to the UE to instruct the UE to add the second network element and convert the QF1 in the PDU Session to the DRB2 established on the second network element side to continue transmission. The UE performs corresponding operations according to the received message 3*a*, and the operations includes but are not limited to: establishing various protocol entities related to DRB2 and replying a response message 3*b* to the first network element, accessing the second network element (3*c*), and starting to send uplink data packets of the QF1 to the second network element via the DRB2 after accessing successfully.

In the process, the specific operations of the UE side on the uplink data packet of the QF1 can be divided into two parts:

(1) For the uplink data packets that the SDAP has delivered to the packet data convergence protocol (PDCP) entity corresponding to DRB1 when the message 3*a* is received, and the uplink data packets received by the SDAP before the second network element is accessed, the UE continues to transmit the data packets on the DRB1; accordingly, the first network element will continue to upload data to the UPF.

(2) After the second network element is successfully accessed, the SDAP delivers the newly received uplink data packets of the QF1 to the PDCP entity corresponding to the DRB2 for transmission; and correspondingly, the PDCP disposed in the second network element stores the received uplink data packets of the QF1.

The SDAP will mark the last uplink data packet, transmitted on the DRB1, of the QF1, for example, as an End Marker; in addition, because QF2 is still transmitted on the DRB1, that is, after the QF1 is remapped to the DRB2 to start data transmission, the DRB1 transmitting the QF2 and the DRB2 transmitting the QF1 will perform PDCP entity processing independently, such as numbering, encryption, etc.

It should be noted that the scheme described in this embodiment is also applicable to the scenario where the QF1 and the QF2 were originally mapped to different DRBs on the first network element side. At this time, after the data packets of the QF1 are transmitted, protocol entities of the DRB responsible for transmitting the data packets of the QF1 on the first network element side can be deleted, which will not affect the DRB responsible for transmitting the data packets of the QF2, nor will it affect the data transmission on the second network element side.

After receiving the last uplink data packet of the QF1 and uploading to UPF, the first network element sends the indication information 3*d* (for example, referred to as UPF Deliver Start) to the second network element to indicate that the second network element can start upload the data packets of the QF1 to the UPF; the information 3*d* can be sent to the second network element through control plane signaling (any Xn interface message) or user plane data.

After receiving the information 3*d*, the PDCP entity corresponding to the DRB2 on the second network element side may deliver the stored uplink data packets of the QF1 to the SDAP sequentially, and then the SDAP further uploads the uplink data packets of the QF1 to the UPF through the GTPU2 (the uplink address is the UL NG-U Address).

Therefore, the data packets of QF1 received by the UPF on the UL NG-U Address are sequential.

In step 4, after receiving the message 3*b*, the first network element sends a message 4*a* (such as PDU SESSION RESOURCE MODIFY INDICATION) to the core network to request an additional UL NG-U Address for the split PDU Session. The message 4*a* also carries the DL NG-U Address @SN allocated by the second network element for the QF1.

The AMF replies to the first network element with a response message 4*b* (PDU SESSION RESOURCE MODIFY CONFIRM) carrying Additional UL NG-U Address. The PDU Session Resource Modify Indication program of the NG interface can be referred to TS 38.413 v0.8.0.

The first network element sends a message 4*c* (such as S-NODE MODIFICATION REQUEST) to the second network element to notify the Additional UL NG-U Address, and receives a response message 4*d* (S-NODE MODIFICATION REQUEST ACKNOWLEDGE) from the second network element. As a result, a formal tunnel (GTPU3) for transmitting the data packets of the QF1 between the second network element and the UPF is successfully established.

The interface program (such as M-NG-RAN node initiated S-NG-RAN node Modification Preparation) between network elements refers to TS 38.423 v0.8.0.

Embodiment 2

Figure 8:
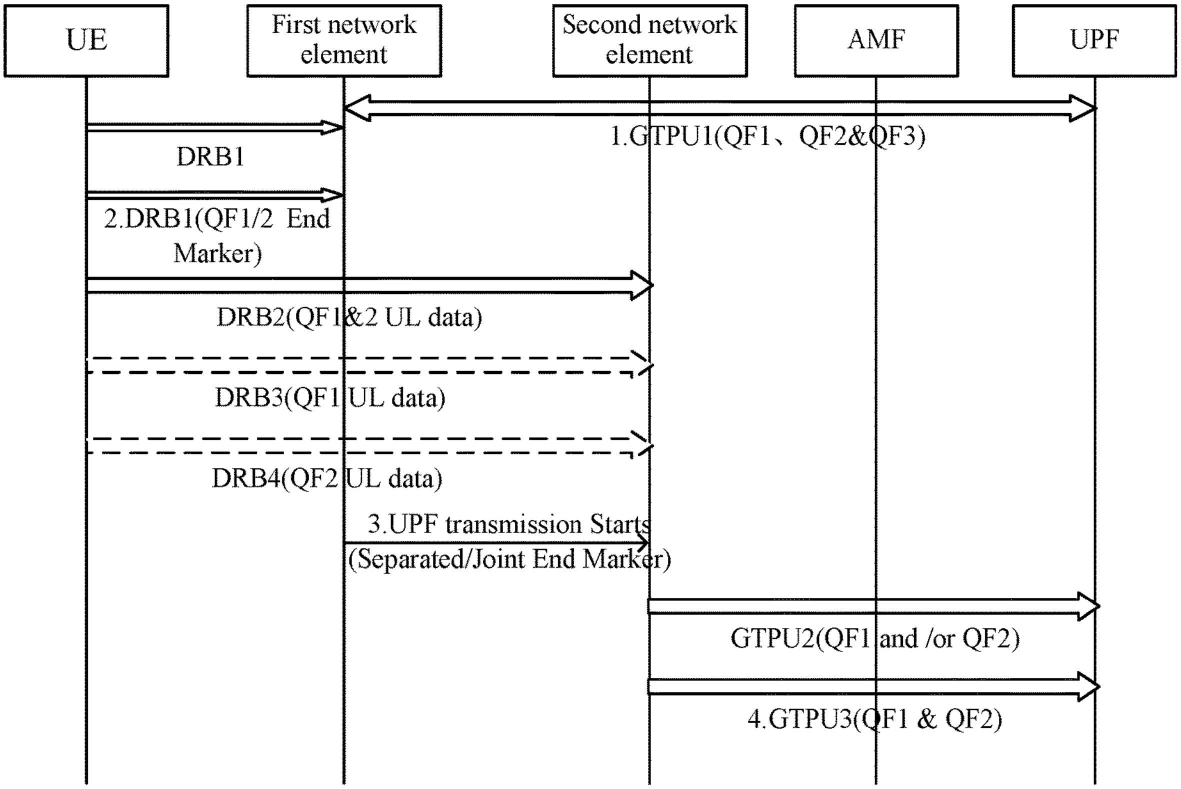
FIG. 8 is a flowchart of a configuration method for a data flow according to embodiment 2 of the present disclosure.

In embodiment 2, the first network element is a MN, and the second network element is a SN. The scenario and scheme described in embodiment 2 are basically the same as those in embodiment 1. The differences (the same content based on the signaling and the program will not be repeated one by one) are mainly described as follows. FIG. 8 is a flowchart of a configuration method for a data flow according to embodiment 2 of the present disclosure. As show in FIG. 8, the configuration method for a data flow according to the embodiment 2 of the present disclosure includes steps described below.

In step 1, through the PDU Session Resource Setup and RRC reconfiguration programs, a GTPU1 constructed by UL NG-U Address and DL NG-U Address is established on the NG interface to transmit a non-split PDU Session. The PDU Session includes 3 QFs (denoted as QF1, QF2, and QF3), and the 3 QFs are mapped to a DRB (denoted as DRB1) on the first network element side.

In step 2, the first network element decides to reconfigure the PDU Session as a split form and offload the QF1 and the QF2 to the second network element; the second network element can have two alternative mapping relationships below.

1) The QF1 and the QF2 are mapped on a DRB (denoted as DRB2).

2) The QF1 and the QF2 are respectively mapped on different DRBs (denoted as DRB3 and DRB4 respectively).

When the UE performs the radio resource configuration of DRB2 or DRB3&4 and accesses the second network element, the SDAP in the UE marks respectively the last data packet of the QF1 and the last data packet of the QF2, which are delivered to the PDCP entity corresponding to DRB1, as the End Marker; then, the SDAP starts to deliver the data packets of the QF1 and the QF2 to the DRB2 or the DRB3/4 for transmission.

The first network element keeps uploading the received data packets of QF1&QF2 to the UPF; the PDCP entity corresponding to DRB2 or DRB3/4 on the second network element side stores the received data packets of QF1 and/or QF2.

In step 3, after receiving the End Marker data packet indicated by the UE, the first network element instructs the second network element through the message 3 that delivering the uplink data packets to the UPF can be started. The indication can have two schemes below.

(1) The QF1 and the QF2 are instructed respectively, that is, the instruction is performed two times on the interface between network elements, each time indicates data packets of which QF can be uploaded; and in this scheme, if each of the QF1 and the QF2 is mapped on the DRB2, then the PDCP entity corresponding to the DRB2 needs to be able to distinguish the QF to which each PDCP data packet belongs.

2) The QF1 and the QF2 are jointly instructed.

After receiving the instruction, the second network element starts to deliver the stored uplink data packets of the QF1 and/or the QF2 to the SDAP, and the SDAP further uploads the data packets to the UPF via the GTPU2 (the uplink address is UL NG-U Address).

In step 4, after the first network element exchanges address information with the AMF, the GTPU3 (constructed by Additional UL NG-U Address and DL NG-U Address @SN) that formally transmits the data packets of the QF1 and the QF2 is successfully established.

Embodiment 3

In Embodiment 3, the first network element is a MN, and the second network element is a SN, and Embodiment 3 and Embodiment 1 have a same application scenario, and the differences are mainly described below.

The scheme described in this embodiment includes steps described below. The first network element firstly requests an additional uplink NG-U interface address from the AMF, and then initiates an adding program to the second network element; in addition, through the method that the first network element notifies indication information related to the tail packet to the second network element or the UPF, the uplink data packets finally processed by the core network are sequential.

Figure 9:
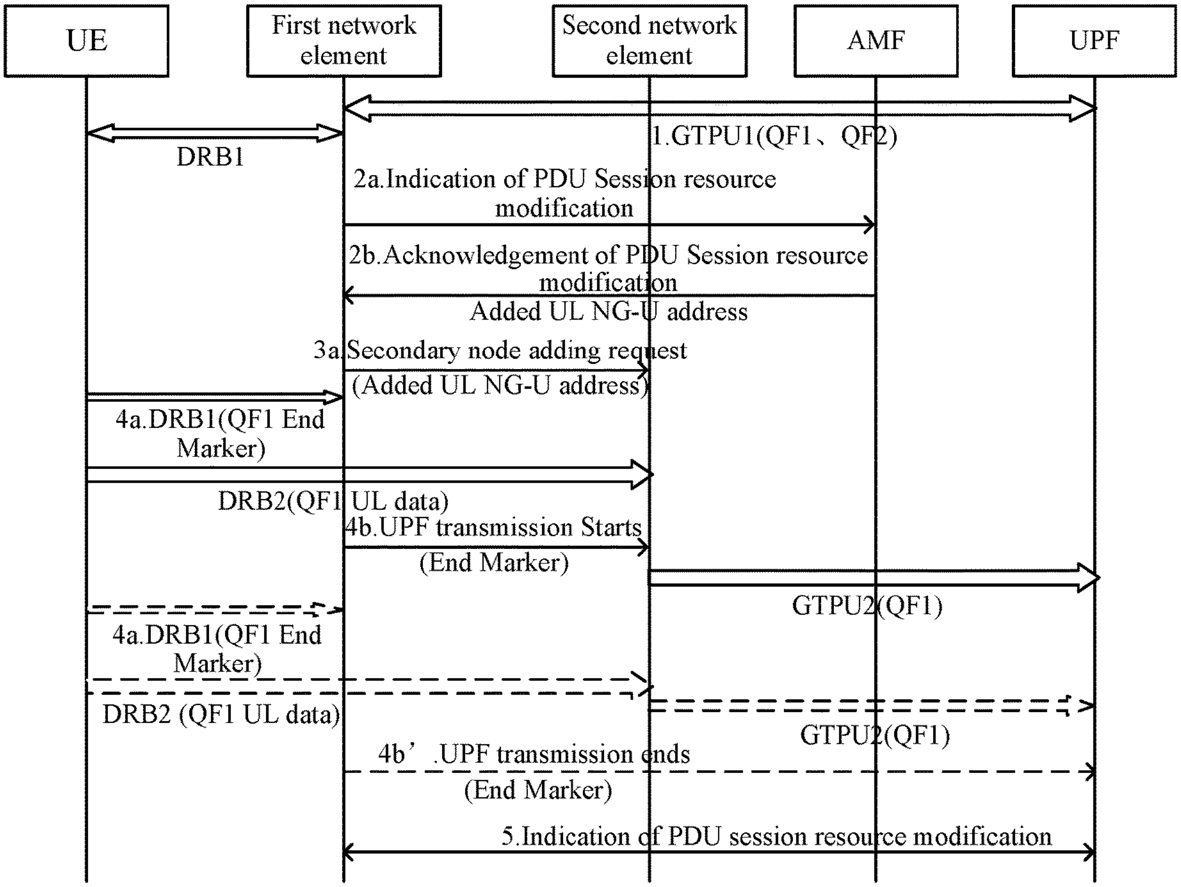
FIG. 9 is a flowchart of a configuration method for a data flow according to embodiment 3 of the present disclosure.

FIG. 9 is a flowchart of a configuration method for a data flow according to embodiment 3 of the present disclosure. As show in FIG. 9, the configuration method for a data flow according to the embodiment 3 of the present disclosure includes steps described below.

In step 1, through the PDU Session Resource Setup and RRC reconfiguration programs, the GTPU1 constructed by UL NG-U Address and DL NG-U Address is established on the NG interface to transmit a non-split PDU Session. The PDU Session includes 2 QFs (denoted as QF1, and QF2), and mapped a DRB (denoted as DRB1) on the first network element side.

In step 2, when the first network element decides to add the second network element and reconfigures the PDU Session as a split form, the first network element firstly sends a request message 2*a* to the AMF through the NG interface, so as to request the core network to configure the additional UL NG-U Address for the PDU Session; the message 2*a* may be formed by adding a new information element into an existing NG-C interface message (such as PDU SESSION RESOURCE MODIFY INDICATION), or may be a new NG-C interface message.

The AMF replies a response message 2*b* carrying the Additional UL NG-U Address on the NG interface (for example, newly adding an information element in PDU SESSION RESOURCE MODIFY CONFIRM); it should be noted that the program does not affect the downlink NG interface address of the GTPU1.

In step 3, the first network element sends a message 3*a* (S-NODE ADDITION REQUEST) to the second network element to request the second network element to provide radio resources for the QF1, and the Additional UL NG-U Address is written into the information element UL NG-U UP TNL Information at UPF in the message 3*a*.

The second network element decides to map the accepted QF1 to a DRB (denoted herein as the DRB 2) and replies to the first network element with a message 3*b* (S-NODE ADDITION REQUEST ACKNOWLEDGE), where the message 3*b* carries the DL NG-U Address (denoted as DL NG-U Address @ SN) allocated by the second network element for the QF1 (such as the PDU Session).

In step 4, the RRC signaling program between the UE and the first network element and the behavior of the UE side are the same as those in step 3 described in the embodiment 1; and the behavior of the network side may have two options.

1) Similarly to the description of the embodiment 1, when the second network element receives only the uplink data packets of the QF1 sent by the UE, the PDCP entity corresponding to the DRB2 stores the data packets; after receiving the data packet marked with End Marker in QF1 (step 4*a*), the SDAP of the first network element indicates to the second network element that uploading the data packets of the QF1 can be started (message 4*b*), and after receiving the indication information, the second network element starts uploading the stored data packets to the SDAP and the UPF.

2) Alternatively, the second network element normally processes the received uplink data packets, that is, the uplink data packets are uploaded to the UPF after being received, but the UPF temporarily stores the data packets of the QF1 received on the Additional UL NG-U Address (GTPU 2); after receiving the packet marked with the End Marker (step 4*a*') in the QF1, the SDAP on the first network element side also indicates the marking information to the UPF (4*b*', which may be implemented by using user plane data or control plane information), and the UPF starts processing the data packets of the QF1 received on the Additional UL NG-U Address only after receiving the marking information.

Each of the two options can ensure that the data packets of the QF1 ultimately processed by the UPF are sequential.

In step 5, through a program 5*a* (PDU Session Resource Module indication) carrying the DL NG-U Address @ SN, the data tunnel for formally transmitting the data packets of the QF1 is successfully established.

It should be noted that the schemes described in the above embodiments can be applied to other different situations of the number of QFs/the number of DRBs and a mapping relationship between a QF and a DRB, and the application is not enumerated one by one.

Embodiment 4

In embodiment 4, the first network element is a MN and the second network element is a SN.

The scenario described in this embodiment is: for a UE in the DC state, on the NG-U interface, a non-split PDU Session is established between the UPF and the second network element; and when the second network element sends a message to the first network element to request to release part of QFs in the PDU Session, the first network element decides that the first network element undertakes continuous transmission of the QF, that is the PDU Session is reconfigured as a split form.

Figure 10:
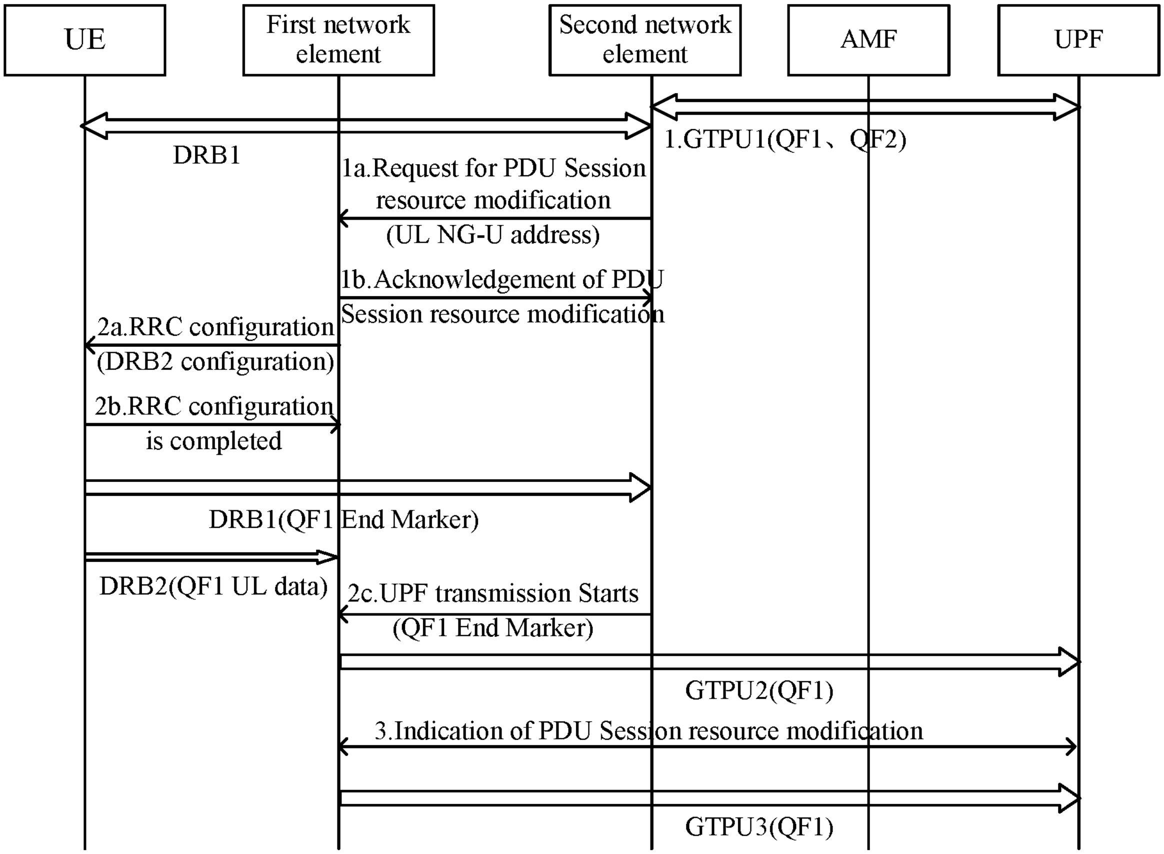
FIG. 10 is a flowchart of a configuration method for a data flow according to embodiment 4 of the present disclosure.

The scheme of this embodiment is similar to the embodiment 1, FIG. 10 is a flowchart of a configuration method for a data flow according to embodiment 4 of the present disclosure. As shown in FIG. 10, the configuration method for a data flow according to embodiment 4 of the present disclosure includes the following steps:

In step 1, for a UE in the DC state, a non-split PDU Session (including the QF1 and the QF 2) is transmitted on the NG interface by a GTP-U tunnel (addresses are denoted as UL NG-U Address and DL NG-U Address @ SN) established between the second network element and the UPF, and a bearer denoted as DRB1 on a wireless interface.

The second network element can request the first network element to release part of QFs (such as the QF1) in the PDU Session through the message 1*a* (such as the S-NODE MODIFICATION REQUIRED message) between network elements; in the message 1*a*, the second network element may indicate the known UL NG-U Address configured on the UPF for the PDU Session to the first network element for backup. Optionally, if it is set that the first network element will save the UL NG-U Address during the establishment of the PDU Session, the second network element may no longer indicate the UL NG-U Address.

After receiving the message 1*a*, the first network element can decide to continue the data transmission of the QF1 based on radio resources of the first network element, that is, the PDU Session is reconfigured as a split form; the first network element replies to the second network element with a response message 1*b* (S-NODE MODIFICATION CONFIRM) to inform the success of the request.

In step 2, in the RRC Reconfiguration program, the first network element indicates the generated radio resource configuration to the UE; and according to the configuration, the UE establishes the DRB2 on a radio interface between the UE and the first network element, and the DRB2 transmits data packets of the QF1.

The subsequent marking of the tail packet and the transmission behavior of other data packets are the same as step 3 of the first embodiment, but the first network element and the second network element are exchanged for receiving and sending (referring to FIG. 6), which will not be repeated here.

In step 3, the first network element notifies the core network of the NG-U downlink address (denoted as DL NG-U Address) allocated by the first network element for the PDU Session, and also receives the additional NG-U uplink address (denoted as Additional UL NG-U Address) which is configured on the UPF for the PDU Session. In this manner, the data tunnel for the formal transmission of the QF1 is successfully established.

It should be understood that the devices and the methods disclosed in the embodiments of the present application may be implemented in other ways. The apparatus embodiments described above are merely illustrative, for example, the flowcharts and block diagrams in the drawings show the possible implementation architectures, functions, and functions of the apparatus, method, and computer program products according to multiple embodiments of the present application. In this point, each block in the flowchart or block diagram may represent a module, program segment, or part of the code, and the module, program segment, or part of the code includes one or more executable instructions for implementing the specified logical function. It should also be noted that in some alternative implementations, the functions marked in the block may also occur in a different order from the order marked in the drawings. For example, two consecutive blocks can actually be executed in parallel, or they can sometimes be executed in the reverse order, depending on the functions involved. It should also be noted that each block in the block diagram and/or flowchart, and the combination of the blocks in the block diagram and/or flowchart, can be implemented by a dedicated hardware-based system that performs the specified functions or actions, or can be implemented by a combination of dedicated hardware and computer instructions.

In addition, the functional modules in the various embodiments of the present application may be integrated together to form an independent part, or each module may exist alone, or two or more modules may be integrated to form an independent part.

The above are only preferred embodiments of the present application and are not intended to limit the scope of the present application. Any modifications, equivalent substitutions, improvements and the like made within the spirit and principle of the present application should fall within the scope of the present application.

We claim:

1. A method of configuring quality of service (QoS) flow, comprising:

receiving, by a first network element from a core network, an uplink interface address on the core network for a non-split protocol data unit (PDU) session comprising a first QoS flow and a second QoS flow;

transmitting, by the first network element, for the non-split PDU session, the first QoS flow and the second QoS Flow to the core network;

sending, by the first network element to a second network element, a request message identifying the uplink interface address on the core network upon which to offload the first QoS flow from the first network element to the second network element, while the second QoS flow remains mapped to the first network element, to reconfigure the non-split PDU session as a split PDU session;

receiving, by the first network element from the second network element, a response message identifying a downlink interface address allocated by the second network element for offloading the first QoS flow;

sending, by the first network element to a user equipment (UE), responsive to the response message, a configuration message to instruct the UE to establish a data radio bearer (DRB) with the second network element to reconfigure the non-split PDU session as the split PDU session and to continue transmission of the first QoS flow by offloading the first QoS flow from the first network element to the second network element, while maintaining transmission of the second QoS flow from the first network element to the core network;

receiving, by the first network element from the UE, a completion message responsive to synchronization with the second network element for offloading the first QoS flow;

receiving, by the first network element from the UE, an uplink end marker responsive to the transmission of the first QoS flow on the DRB;

sending, by the first network element to the second network element, responsive to receiving the uplink end marker, an indication message to indicate to the second network element to start uploading data packets of the first QoS flow to the core network identified by the uplink interface address; and continuing, by the first network element, for the split PDU session, the transmission of the second QoS flow to the core network, concurrent with the second network element uploading the data packets of the first QoS flow to the core network.

2. The method of claim 1, further comprising sending, by the first network element to the core network, a second request message identifying the downlink interface address for the split PDU session.

3. The method of claim 1, further comprising establishing, by the first network element, a tunnel on an interface to exchange data packets of the first QoS flow to be offloaded via the second network element.

4. The method of claim 1, wherein the configuration message is further configured to instruct the UE to access a packet data convergence protocol (PDCP) of the second network element corresponding to the DRB to store data packets of the first QoS flow.

5. The method of claim 1, wherein the uplink interface address comprises at least one of: an uplink interface address applied for the non-split PDU session or an uplink interface address when the non-split PDU session is created, and wherein the downlink interface address comprises an interface address between the core network and an access network.

6. A method of configuring quality of service (QoS) flow, comprising:

receiving, by a user equipment (UE) from a first network element in a non-split protocol data unit (PDU) session with a core network, a configuration message to instruct the UE to establish a data radio bearer (DRB) with a second network element, the non-split PDU session comprising a first QoS flow and a second QoS flow, responsive to a response message identifying a downlink interface address allocated by the second network element for offloading the first QoS flow, wherein an uplink interface address on the core network upon which to offload the first QoS flow is received by the second network element from the first network element;

establishing, by the UE, the DRB with the second network element to continue transmission of the first QoS flow by offloading the first QoS flow from the first network element to the second network element, while the second QoS flow remains mapped to the first network element to reconfigure the non-split PDU session as a split PDU session;

sending, by the UE to the first network element, a completion message responsive to synchronization with the second network element for offloading the first QoS flow;

sending, by the UE to the first network element, an uplink end marker responsive to the transmission of the first QoS flow on the DRB, to cause the first network element to send an indication message to the second network element to indicate to the second network element to start uploading data packets of the first QoS flow to the core network identified by the uplink interface address to reconfigure the non-split PDU session as the split PDU session; and storing, by the UE, using the DRB, data packets of the first QoS flow onto the second network element, concurrent with the first network element continuing the transmission of the second QoS flow to the core network for the split PDU session.

7. The method of claim 6, further comprising continuing, by the UE prior to accessing the second network element, transmission of the data packets of the first QoS flow via the first network element.

8. The method of claim 6, further comprising accessing, by the UE, a packet data convergence protocol (PDCP) of the second network element corresponding to the DRB to store the data packets of the first QoS flow.

9. The method of claim 6, further comprising converting, by the UE responsive to the configuration message, the first QoS flow from a protocol data unit (PDU) session to the DRB established on the second network element to continue transmission.

10. A first network element, comprising:

one or more processors coupled with memory, configured to:

receive, from a core network, an uplink interface address on the core network for a non-split protocol data unit (PDU) session comprising a first QoS flow and a second QoS flow;

transmit, for the non-split PDU session, the first QoS flow and the second QoS Flow to the core network;

send, to a second network element, a request message identifying the uplink interface address on the core network upon which to offload the first QoS flow from the first network element to the second network element, while the second QoS flow remains mapped to the first network element, to reconfigure the non-split PDU session as a split PDU session;

receive, from the second network element, a response message identifying a downlink interface address allocated by the second network element for offloading the first QoS flow;

send, to a user equipment (UE), responsive to the response message, a configuration message to instruct the UE to establish a data radio bearer (DRB) with the second network element to reconfigure the non-split PDU session as the split PDU session and to continue transmission of the first QoS flow by offloading the first QoS flow from the first network element to the second network element, while maintaining transmission of the second QoS flow from the first network element to the core network;

receive, from the UE, a completion message responsive to synchronization with the second network element for offloading the first QoS flow;

receive, from the UE, an uplink end marker responsive to the transmission of the first QoS flow on the DRB;

send, to the second network element, responsive to receiving the uplink end marker, an indication message to indicate to the second network element to start uploading data packets of the first QoS flow to the core network identified by the uplink interface address; and continue, for the split PDU session, the transmission of the second QoS flow to the core network, concurrent with the second network element uploading the data packets of the first QoS flow to the core network.

11. The first network element of claim 10, wherein the one or more processors are further configured to send, to the core network, a second request message identifying the downlink interface address for the split PDU session.

12. The first network element of claim 10, wherein the one or more processors are further configured to establish a tunnel on an interface to exchange data packets of the first QoS flow to be offloaded via the second network element.

13. The first network element of claim 10, wherein the configuration message is further configured to instruct the UE to access a packet data convergence protocol (PDCP) of the second network element corresponding to the DRB to store data packets of the first QoS flow.

14. A user equipment, comprising:

one or more processors configured to:

receive, via a transceiver from a first network element in a non-split protocol data unit (PDU) session with a core network, a configuration message to instruct the user equipment (UE) to establish a data radio bearer (DRB) with a second network element, the non-split PDU session comprising a first QoS flow and a second QoS flow, responsive to a response message identifying a downlink interface address allocated by the second network element for offloading the first QoS flow, wherein an uplink interface address on the core network upon which to offload the first QoS flow is received by the second network element from the first network element;

establish the DRB with the second network element to continue transmission of the first QoS flow by offloading the first QoS flow from the first network element to the second network element, while the second QoS flow remains mapped to the first network element to reconfigure the non-split PDU session as a split PDU session;

send, via the transceiver to the first network element, a completion message responsive to synchronization with the second network element for offloading the first QoS flow;

send, via the transceiver to the first network element, an uplink end marker responsive to the transmission of the first QoS flow on the DRB, to cause the first network element to send an indication message to the second network element to indicate to the second network element to start uploading data packets of the first QoS flow to the core network identified by the uplink interface address to reconfigure the non-split PDU session as the split PDU session; and store, using the DRB, data packets of the first QoS flow onto the second network element, concurrent with the first network element continuing the transmission of the second QoS flow to the core network for the split PDU session.

15. The user equipment of claim 14, wherein the one or more processors are further configured to access a packet data convergence protocol (PDCP) of the second network element corresponding to the DRB to store the data packets of the first QoS flow.

16. The user equipment of claim 14, wherein the one or more processors are further configured to convert, responsive to the configuration message, the first QoS flow from a protocol data unit (PDU) session to the DRB established on the second network element to continue transmission.

* * * * *